United States Patent
Ikeda

(10) Patent No.: US 8,499,205 B2
(45) Date of Patent: Jul. 30, 2013

(54) DATA RECEPTION DEVICE, DATA RECEPTION METHOD, AND PROGRAM

(75) Inventor: Motoshige Ikeda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 455 days.

(21) Appl. No.: 12/938,621

(22) Filed: Nov. 3, 2010

(65) Prior Publication Data

US 2011/0113293 A1 May 12, 2011

(30) Foreign Application Priority Data

Nov. 9, 2009 (JP) ................................. 2009-256492

(51) Int. Cl.
*G06F 11/00* (2006.01)
(52) U.S. Cl.
USPC .......................................... 714/701; 714/700
(58) Field of Classification Search
None
See application file for complete search history.

(56) References Cited

U.S. PATENT DOCUMENTS

| | | | | | |
|---|---|---|---|---|---|
| 7,346,798 | B2 * | 3/2008 | Tseng | ............................ | 713/500 |
| 7,434,114 | B2 * | 10/2008 | Jang et al. | ...................... | 714/700 |
| 7,613,959 | B2 * | 11/2009 | Tseng | ............................ | 714/704 |
| 7,631,118 | B2 * | 12/2009 | Renaud et al. | ................... | 710/52 |
| 7,661,039 | B2 * | 2/2010 | Boudon et al. | ................. | 714/707 |
| 8,352,773 | B2 * | 1/2013 | Chuang et al. | ................. | 713/503 |
| 2007/0177701 | A1 * | 8/2007 | Thanigasalam | ............... | 375/372 |
| 2010/0251001 | A1 * | 9/2010 | Drescher et al. | ................... | 714/2 |
| 2010/0315135 | A1 * | 12/2010 | Lai et al. | ........................ | 327/145 |
| 2011/0243211 | A1 * | 10/2011 | Chacko et al. | ................. | 375/228 |

FOREIGN PATENT DOCUMENTS

JP 2005-268910 A 9/2005

* cited by examiner

*Primary Examiner* — Gabriel Chu
(74) *Attorney, Agent, or Firm* — Foley & Lardner LLP

(57) ABSTRACT

A data reception device that receives scrambled and transmission data as received data and that descrambles and outputs the data after adjusting the timing with the transmitter has a descramble circuit 10 detect timing adjustment data included in a timing adjustment data set that adjusts the timing with the transmitter in the data which the descramble circuit 10 has not descrambled, and comprises an LFSR suspending signal generation circuit 9 that outputs a required number of LFSR suspending signals, after first normal timing adjustment data has been received, at the output timing of data received thereafter so as to simulate a situation as if a desired number of timing adjustment data included in the timing adjustment data set were received.

18 Claims, 13 Drawing Sheets

TRANSMITTER SIDE

| D | D | SKP | SKP | SHP | SHP | SHP | EPF | D | D | D |
|---|---|-----|-----|-----|-----|-----|-----|---|---|---|
| LFSR 1 | 2 | 2 | 2 | 3 | 4 | 5 | 6 | 7 | 8 | 9 |

D: NORMAL DATA

RECEIVER SIDE

| D | D | ERROR | SKP | SHP | SHP | SHP | EPF | ?? | ?? | ?? |
|---|---|-------|-----|-----|-----|-----|-----|----|----|----|

| D | D | ERROR | SKP | SHP | SHP | SHP | EPF | D | D | D |
|---|---|-------|-----|-----|-----|-----|-----|---|---|---|
| LFSR 1 | 2 | 2 | 2 | 3 | 4 | 5 | 6 | 7 | 8 | 9 |

D: NORMAL DATA

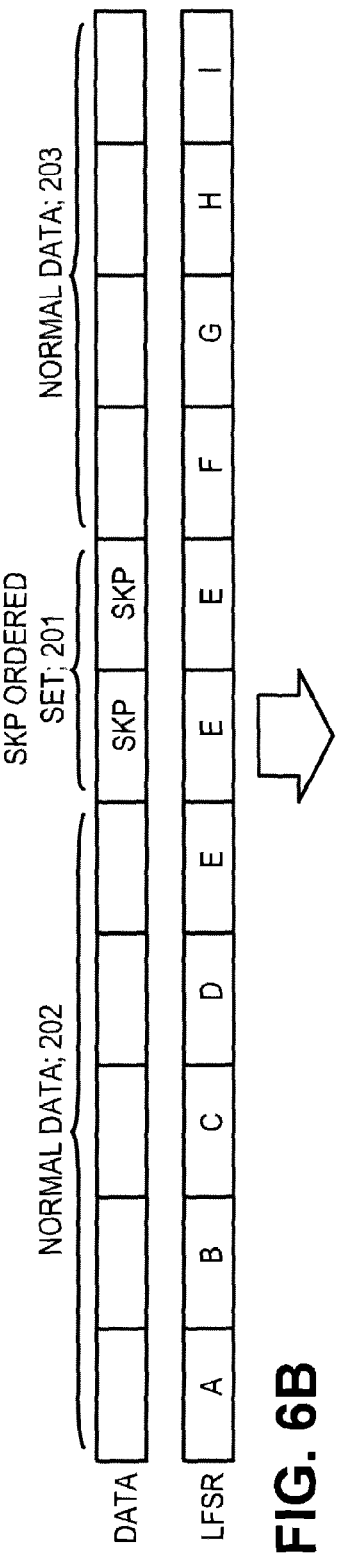
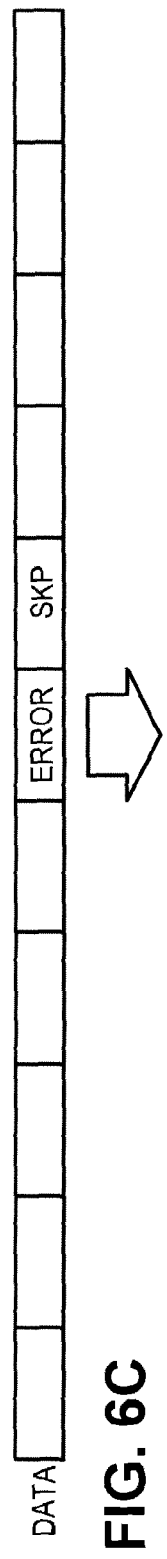
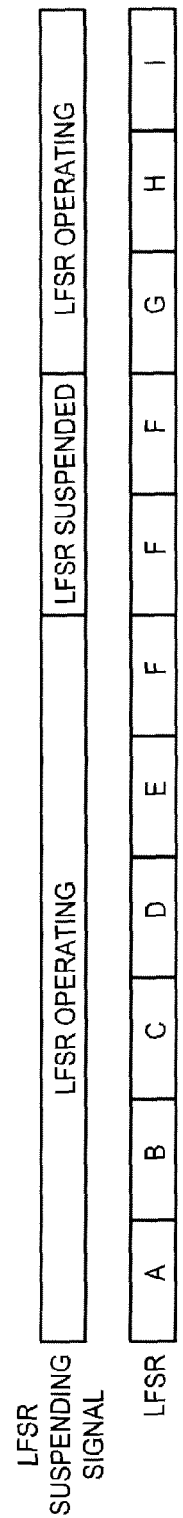

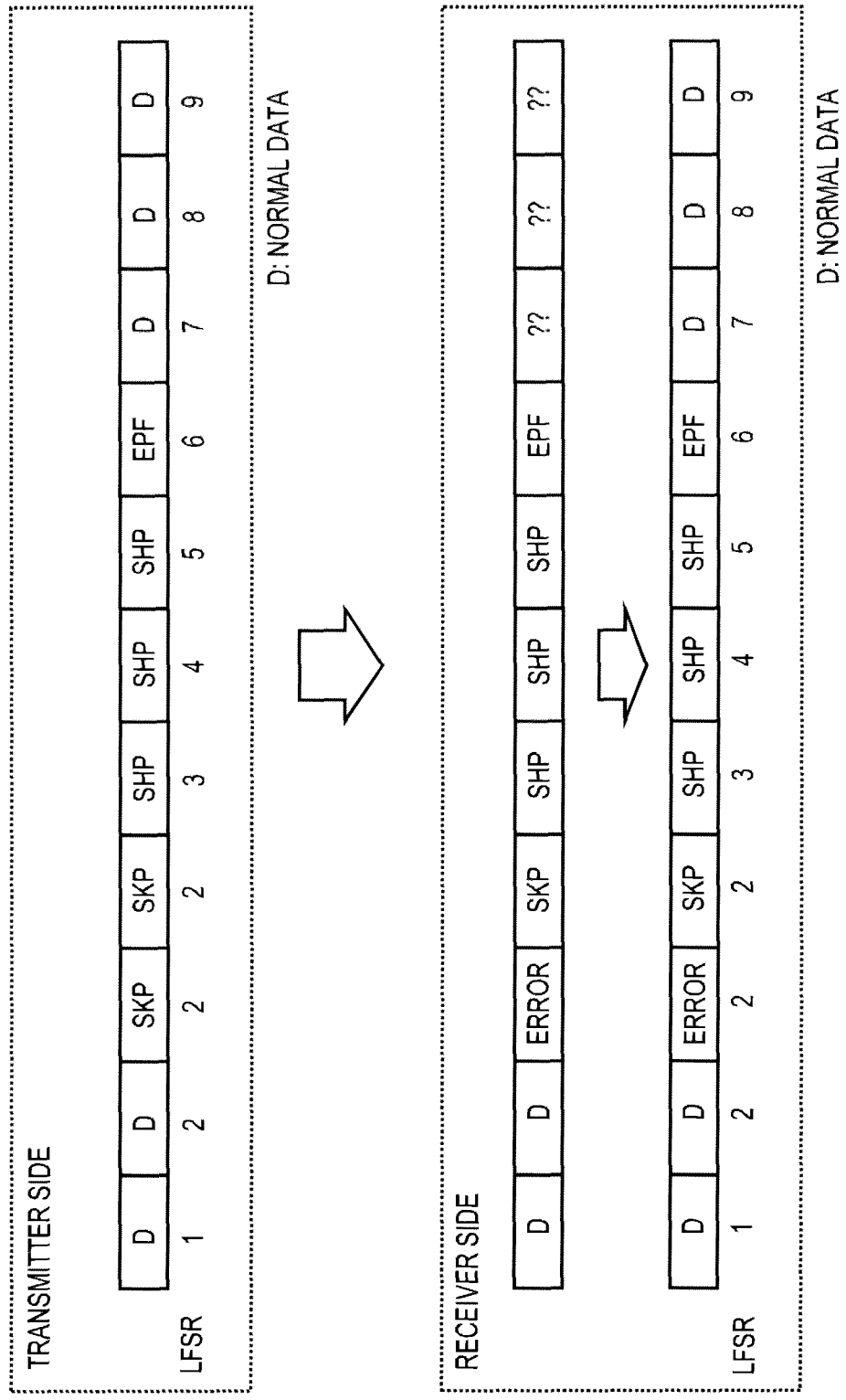

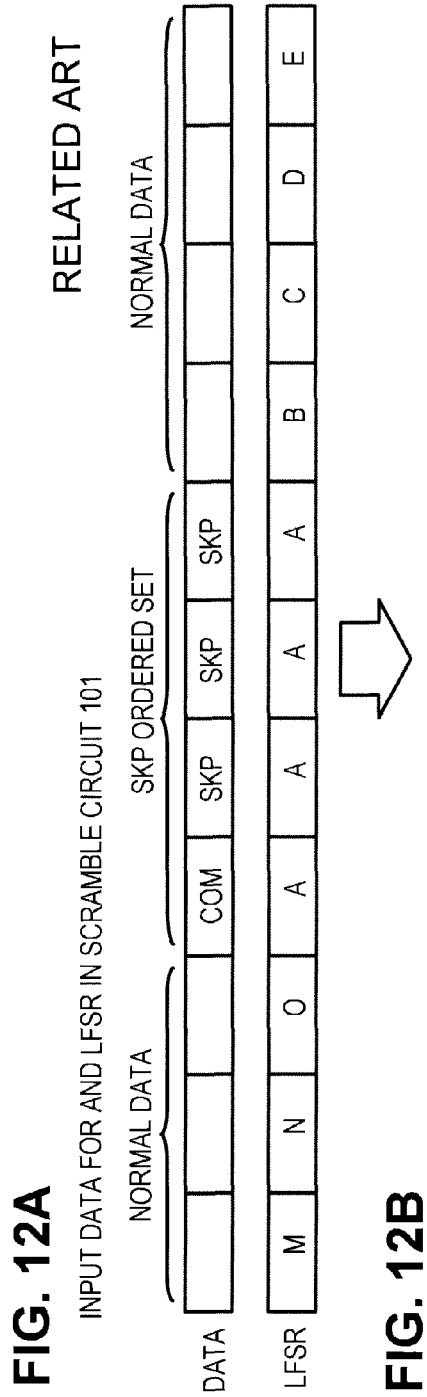

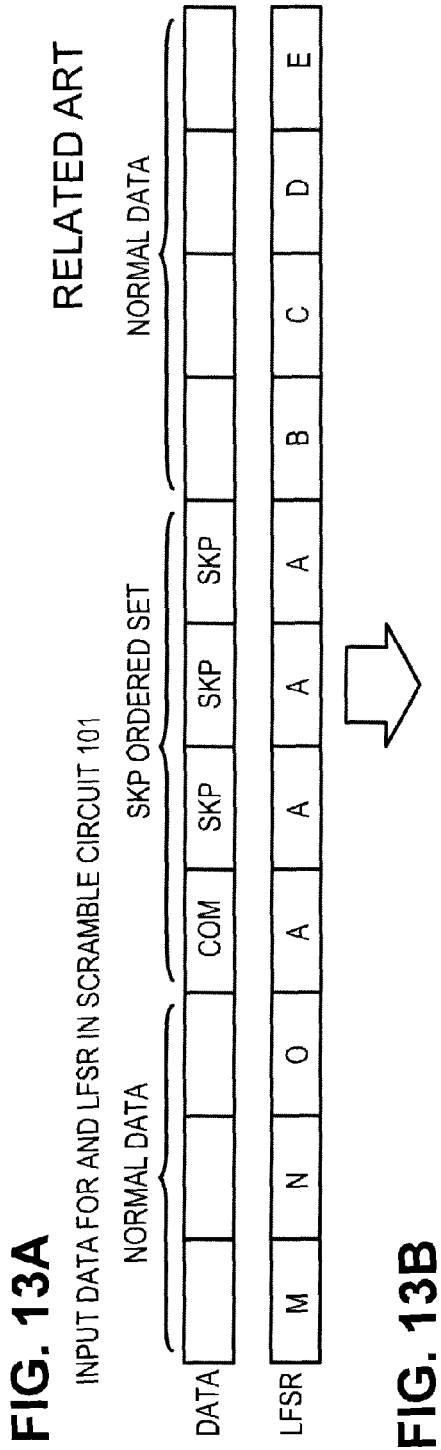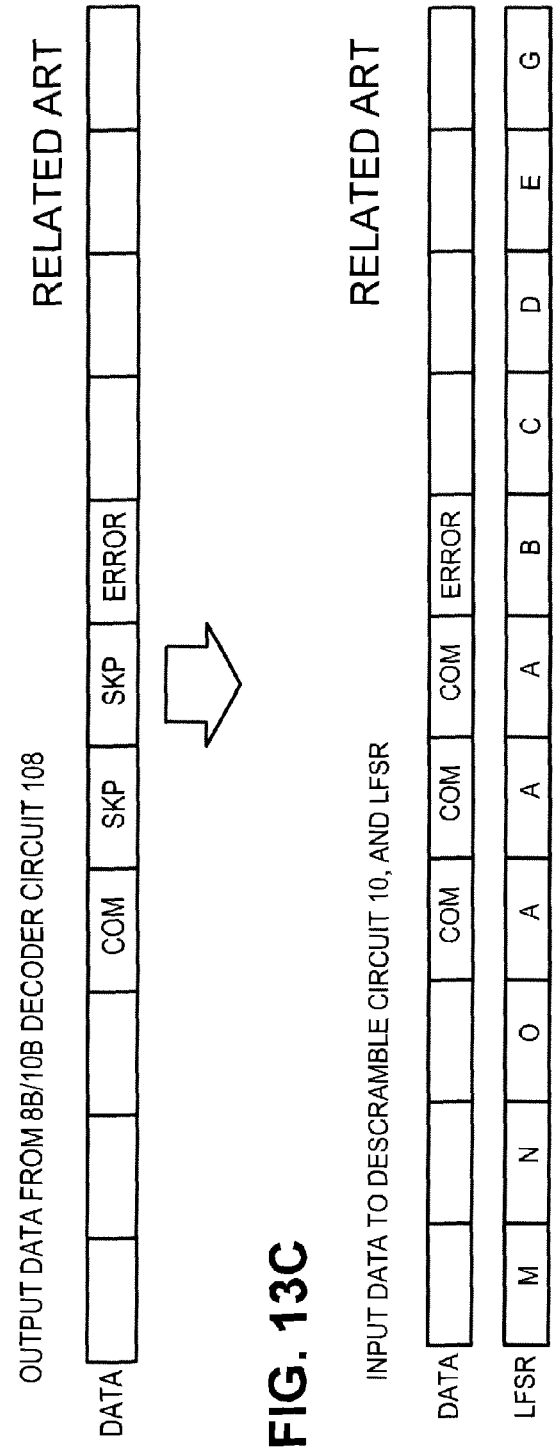

DATA RECEPTION DEVICE, DATA RECEPTION METHOD, AND PROGRAM

TECHNICAL FIELD

Reference to Related Application

This application is based upon and claims the benefit of the priority of Japanese patent application No. 2009-256492, filed on Nov. 9, 2009, the disclosure of which is incorporated herein in its entirety by reference thereto.
The present invention relates to a data reception device, data reception method, and program that perform high-speed serial transfer, and particularly to a data reception device, data reception method, and program that attempt to stabilize data reception.

BACKGROUND

In high-speed serial transfer, since data is superposed on a clock, in order to accurately separate the data and the clock, scramble processing is performed on the transmission data so as to avoid the periodicity of the data (i.e., continuation of the same pattern of data) in the data reception device. Therefore, the data reception device performs descramble processing on the received data.

As a conventional data reception device, Patent Document 1 describes a data reception device capable of initializing a descramble circuit even when a symbol for initialization such as a COM symbol and timing adjustment data such as a SKP symbol are partially damaged due to the influence of noise on a channel. Note that the PCI Express (Peripheral Component Interconnect Express) bus system is used as an example here.

FIG. 10 is a block diagram schematically showing the configuration of a data transfer device using the PCI Express bus system to which the technology described in Patent Document 1 is not applied.

Transmission data is supplied to a data transmission device (including a scramble circuit 101, an 8B/10B encoder circuit 102, and a P/S conversion circuit 103) in the data transfer device, and is scrambled by the scramble circuit 101. Next, the 8B/10B encoder circuit 102 encodes the 8-bit data into 10-bit data so that data of "0" or "1" do not successively occur a predetermined number or more of times. Then, the P/S conversion circuit 103 converts the parallel data into serial data, and the data is transmitted to a differential transmission Lane 104.

Further, data received from a differential reception path (Lane) 105 is supplied to a data reception device (including an S/P conversion circuit 106, an elastic buffer circuit 107, an 8B/10B decoder circuit 108, and a descramble circuit 110) in the data transfer device and is converted from serial data into parallel data by the S/P conversion circuit 106. Then the elastic buffer circuit 107 corrects the clock frequency deviation between the transmitter and the receiver, the 8B/10B decoder circuit 108 decodes the 10-bit data into 8-bit data, and the descramble circuit 110 descramble the data.

In the PCI Express bus system as described, the scramble processing by the scramble circuit 101 and the descramble processing by the descramble circuit 110 are performed by circuits using linear feedback shift registers (LFSR).

To the scramble circuit 101 and the descramble circuit 110, the following rules are applied: the shift register is initialized to an initialized value (FFFh) with a COM symbol and the LFSR shifts, except for when a SKP symbol is received (the LFSR does not shift when a SKP symbol is received); all D codes except those within a Training Sequence and a Compliance Pattern are scrambled and descrambled; and all K codes are not scrambled or descrambled.

The COM symbol is a symbol for initialization, which is data for initializing the scramble circuit 101 and the descramble circuit 110. Further, the SKP symbol is timing adjustment data for correcting the clock frequency deviation between the transmitter side and the receiver side without having the LFSRs shift in the scramble circuit 101 and the descramble circuit 110. Moreover, the K codes are twelve kinds of special data that are not normal data and the K codes include the aforementioned COM symbol and SKP symbol. The D codes are data symbols that are not control data such as the K codes.

In the PCI Express bus system, a timing adjustment data set (SKP ordered set) is inserted at a regular interval (at every 1080 to 1156 symbols) during an idle time of data transmission (D0.0, i.e., a D code 00h is transmitted). The SKP ordered set is one COM symbol followed by three SKP symbols. The clock frequency deviation is corrected by increasing or decreasing the number of the SKP symbols in the SKP ordered set in the elastic buffer circuit 107.

In other words, when the frequency of the receiver side is greater than that of the transmitter side, the Physical Layer of the receiver increases the number of SKP symbols included in the SKP ordered set and hands it to the Link Layer. On the other hand, when the frequency of the transmitter side is greater than that of the receiver side, the Physical Layer of the receiver side decreases the number of SKP symbols included in the SKP ordered set and hands it to the Link Layer.

As described above, the LFSRs in the scramble circuit 101 and the descramble circuit 110 are initialized by the COM symbol. Since the SKP symbol may be added or deleted by the receiver, the LFSRs in the scramble circuit 101 and the descramble circuit 110 do not operate in response to it. In other words, the LFSRs in the scramble circuit 101 and the descramble circuit 110 operate in response to data other than the SKP symbols.

However, in the data transfer device described above, when the received data is damaged and therefore the device is unable to receive the COM symbol, the LFSR in the descramble circuit 110 cannot be initialized and the value of the LFSR deviates from the value of the LFSR in the scramble circuit 101 of the transmitter. Further, when the SKP symbol is damaged and turned into different data, the LFSR in the descramble circuit 110 shifts, although it is not supposed to shift, the values of the LFSRs in the transmitter side and the receiver side deviate from each other, and the device is unable to receive accurate data.

In order to solve this problem, the data reception device described in Patent Document 1 is designed so that the descramble circuit can be initialized even when a symbol for initialization such as the COM symbol and timing adjustment data such as the SKP symbol are partially damaged.

FIG. 11 is a block diagram schematically showing the configuration of the data transfer device described in Patent Document 1. As shown in FIG. 11, a data reception device in the data transfer device described in Patent Document 1 comprises an elastic buffer circuit 107 that receives a signal received from a reception Lane and adjusts the clock frequency of the transmitter side, and a descramble circuit 110 that descrambles an output signal of the elastic buffer circuit 107. In the data reception device described in Patent Document 1, the received signal has a COM symbol that initializes the descramble circuit 110 and a plurality of SKP symbols arranged so as to follow the COM symbol as a data set in a data stream, and a SKP/COM conversion circuit 109 that converts the timing adjustment data in the data set into the initialization data is provided between the elastic buffer circuit 107 and the descramble circuit 110.

FIG. 12A is a drawing for explaining an example of input data the scramble circuit in the data reception device described in Patent Document 1; and LFAR; FIG. 12B is a drawing for explaining an example of output data from the 8B/10B decoder circuit; and FIG. 12C is a drawing for explaining an example of input data to the descramble circuit, and the LFSR. As shown in FIG. 12B, let's assume that an error has occurred on the first SKP symbol in the SKP ordered set in a communication channel in the data generated as shown in FIG. 12A. In this case, the data reception device described in Patent Document 1 replaces all the SKP symbols with COM symbols before descrambling, as shown in FIG. 12C. As a result, the descramble circuit 110 repeats the initialization for the same number of times as the number of the COM symbols replacing the SKP symbols even when an error occurs only on one SKP symbol. In other words, the initialization is reliably performed and it becomes possible to make sure that the descramble processing on the receiver's side corresponds to the scramble processing on the transmitter's side.

[Patent Document 1]
Japanese Patent Kokai Publication No. JP2005-268910A

SUMMARY

The following analysis is given in the light of the present invention. In recent years, high-speed data communication and the reliability of it are demanded in the field of data reception devices for high-speed serial communication. However, it was recently announced that USB 3.0 would employ high-speed serial transfer, and the possibility of transmission noise occurrence has increased due to the fact that a communication cable is used in the usage environment. As a result, the demand has increased for communication devices with high reliability that does not need to re-execute transfer processing even when a timing adjustment symbol is damaged by transmission noise caused by a decrease in reliability.

FIG. 13A is a drawing for explaining another example, by way of analysis, of input data for the scramble circuit and the LFSR in the data reception device described in Patent Document 1; FIG. 13B is a drawing for explaining another example of output data from the 8B/10B decoder circuit; and FIG. 13C is a drawing for explaining another example of input data for the descramble circuit and the LFSR. As shown in FIG. 13B, let's assume that an error has occurred on the last SKP symbol in the SKP ordered set in a communication channel in the data generated as shown in FIG. 13A. As shown in FIG. 13C, the descramble circuit 110 is not initialized when the last SKP symbol in the SKP ordered set is damaged in the technology described in Patent Document 1. In other words, since only SKP symbols subsequent to the damaged SKP symbol are replaced with COM symbols, the damaged SKP symbol cannot be replaced with a COM symbol when the last SKP symbol in the SKP ordered set is damaged. As a result, the descramble processing on the receiver's side does not correspond to the scramble processing on the transmitter's side since the LFSR does not get initialized, and the transfer processing has to be performed again.

It is a main object of the present invention to provide a data reception device, data reception method, and program that make reliable high-speed data transfer possible while avoiding the re-execution of transfer processing.

In a first aspect of the present invention, there is provided a data reception device comprising: an elastic buffer circuit that receives scrambled and transmission data as received data and adjusts timing with a transmitter side; an LFSR suspending signal generation circuit that performs predetermined supplement processing on data whose timing has been adjusted by the elastic buffer circuit and that outputs an LFSR suspending signal; and a descramble circuit that descrambles data whose timing has been adjusted by the elastic buffer circuit in response to an LFSR suspending signal outputted from the LFSR suspending signal generation circuit. The received data has a timing adjustment data set that adjusts the timing with the transmitter side. The LFSR suspending signal generation circuit receives a desired number of timing adjustment data included in the timing adjustment data set, and outputs a required number of LFSR suspending signals so that the descramble processing is normally performed (so that the descramble circuit does not update its LFSR for a desired number of times) after first normal timing adjustment data has been received. The descramble circuit performs the control of the LFSR (referred to as "LFSR suspension" hereinafter) in the descramble circuit in response to the LFSR suspending signal.

In the data reception device of the present invention, it is preferable that the timing adjustment data set be a SKP ordered set and the timing adjustment data be a SKP symbol.

In the data reception device, it is preferable that the number of LFSR suspending signals outputted from the LFSR suspending signal generation circuit be settable to any number.

In the data reception device, it is preferable that the elastic buffer circuit adjust timing in a unit of the timing adjustment data set.

In the data reception device, it is preferable that the elastic buffer circuit adjust timing by increasing or decreasing the timing adjustment data included in the timing adjustment data set.

In the data reception device, it is preferable that the LFSR suspending signal generation circuit calculate the number of timing adjustment data included in a timing adjustment data set based on a notification from the elastic buffer circuit, and output an LFSR suspending signal according to the number of the timing adjustment data after first timing adjustment data has been received.

In the data reception device, it is preferable that the descramble circuit receive data from the elastic buffer circuit and an LFSR suspending signal from the LFSR suspending signal generation circuit, and perform descramble processing according to a timing adjustment data set included in the data from the elastic buffer circuit and the LFSR suspending signal.

In the data reception device, it is preferable that the received data be data in the USB 3.0 system.

In the data reception device, it is preferable that the received data be data in the PCI Express bus system.

In a second aspect of the present invention, there is provided a data reception method that is a data transfer method of a data transfer device receiving scrambled and transmission data as received data and descrambling and outputting the data after adjusting timing with a transmitter side. Timing adjustment data included in a timing adjustment data set that adjusts timing with the transmitter side is detected in the data on which the descramble processing has not been performed. A required number of LFSR suspending signals is outputted, after first normal timing adjustment data has been received, at an output timing of data received thereafter so as to simulate a situation as if a desired number of timing adjustment data included in the timing adjustment data set were received.

In the data reception method, it is preferable that the timing adjustment data set be a SKP ordered set and the timing adjustment data be a SKP symbol.

In the data reception method, it is preferable that the number of LFSR suspending signals outputted after first normal timing adjustment data has been received be settable to any number.

In the data reception method, it is preferable that the timing of the received data be adjusted in a unit of the timing adjustment data set.

In the data reception method, it is preferable that the timing of the received data be adjusted by increasing or decreasing the timing adjustment data included in the timing adjustment data set.

In the data reception method, it is preferable that the number of timing adjustment data included in a timing adjustment data set of the received data be calculated based on a notification from an elastic buffer circuit that adjusts the timing with the transmitter side, and a required number of LFSR suspending signals be outputted according to the number of the timing adjustment data, after first timing adjustment data has been received, at an output timing of data received thereafter.

In the data reception method, it is preferable that the received data be data in the USB 3.0 system.

In the data reception method, it is preferable that the received data be data in the PCI Express bus system.

In a third aspect of the present invention, there is provided a program that has a computer execute the data reception processing described above. Meritorious effects of various aspect of the present invention are mentioned below, however, not limited thereto.

According to the present invention, more reliable high-speed data transfer can be performed while avoiding the re-execution of data transfer processing since the timing of descramble processing can be adjusted even when a timing adjustment data set includes an error by providing an LFSR suspending signal generation circuit in front of a descramble circuit, and controlling the LFSR suspension in the descramble circuit by outputting an LFSR suspending signal to the descramble circuit at a desired timing after first normal timing adjustment data has been received so that the descramble circuit docs not update the LFSR for a desired number of times.

BRIEF DESCRIPTION OF THE DRAWINGS

FIG. 6A is a drawing for explaining an example of input data to the scramble circuit, and LFSR, when an error has occurred in a SKP ordered set in the case where data is processed in the data transfer device relating to a mode of the present invention in the USB 3.0 system; FIG. 6B is a drawing for explaining an example of output data from the 8B/10B decoder circuit; and FIG. 6C is a drawing for explaining, by way of an example, the LFSR suspending signal and the LFSR in the descramble circuit.

FIG. 7 is a drawing for explaining other examples of data respectively supplied to the scramble circuit on the transmitter's side and the descramble circuit on the receiver's side in the case where data is processed in the data transfer device relating to a mode of the present invention in the USB 3.0 system.

FIG. 12A is a drawing for explaining an example of input data for and an LFSR in a scramble circuit in a data reception device described in Patent Document 1; FIG. 12B is a drawing for explaining an example of output data from an 8B/10B decoder circuit; and FIG. 12C is a drawing for explaining an example of input data to a descramble circuit and an LFSR.

FIG. 13A is a drawing for explaining another example of input data for the scramble circuit and the LFSR in the data reception device described in Patent Document 1; FIG. 13B is a drawing for explaining another example of output data from the 8B/10B decoder circuit; and FIG. 13C is a drawing for explaining another example of input data for and the LFSR in the descramble circuit.

PREFERRED MODES

Below, a mode of the present invention will be described with reference to the drawings. The present mode is applied to a data transfer device in high-speed serial communication such as PCI Express. As described above, when the last data (the last symbol) of a timing adjustment data set gets damaged in the data reception device disclosed in Patent Document 1, the descramble processing on the receiver's side dose not corresponds to the scramble processing on the transmitter's side and the transfer processing has to be re-executed. On the other hand, in the present mode, the problem is solved by outputting an LFSR suspending signal to the descramble circuit at desired timing and suspending the operation of the LFSR in the descramble circuit described in the first aspect, SUMMARY so that the descramble circuit does not update the LFSR for a desired of number of times even when, after first normal timing adjustment data has been received, an error occurs on data received thereafter.

Figure 1:
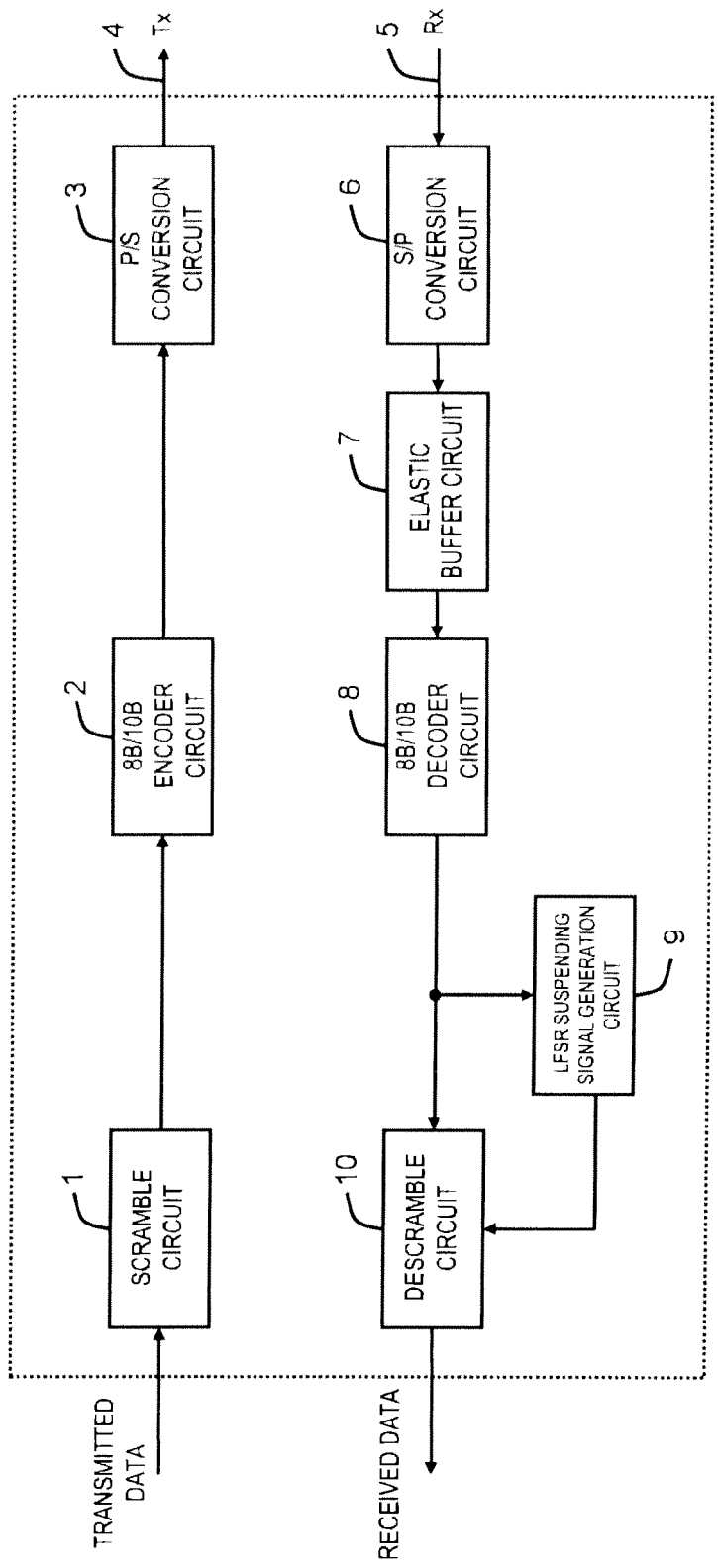
FIG. 1 is a block diagram schematically showing the configuration of a data transfer device relating to a mode of the present invention.
Figure 11:
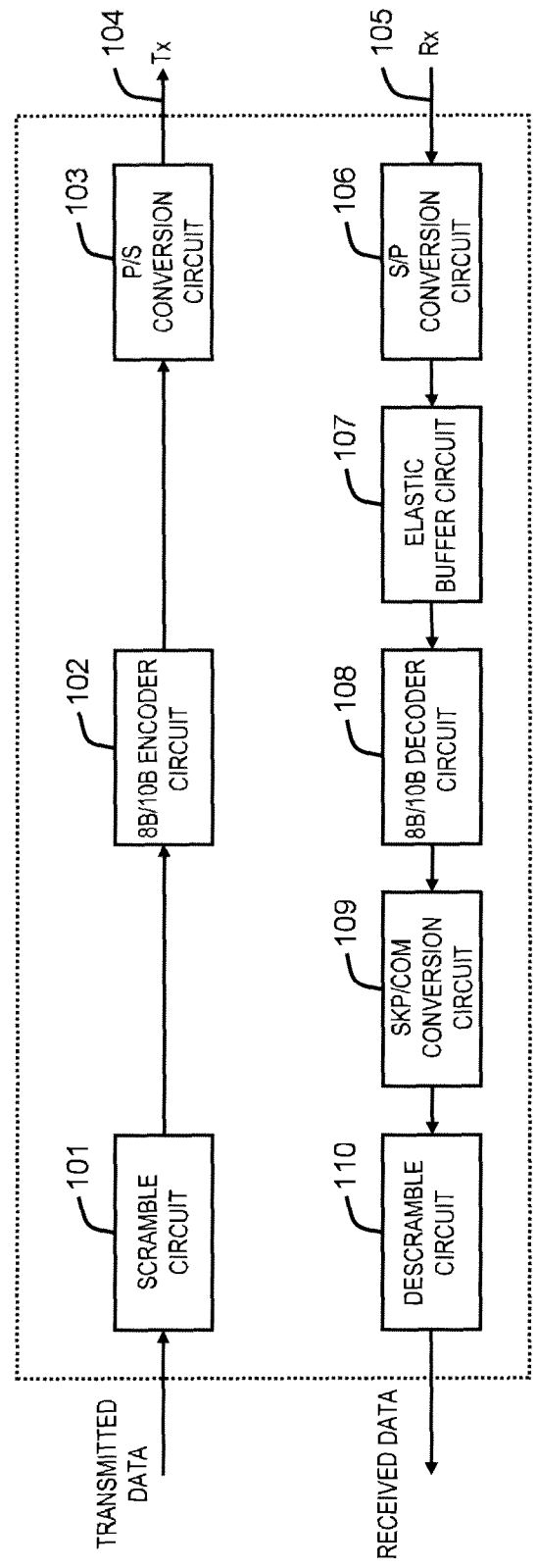
FIG. 11 is a block diagram schematically showing the configuration of a data transfer device described in Patent Document 1.

FIG. 1 is a block diagram schematically showing the configuration of a data transfer device relating to a mode of the present invention. As shown in FIG. 1, in the data transfer device relating to the present mode, the SKP/COM conversion circuit (109 in FIG. 11) in the data transfer device described in Patent Document 1 is omitted; an LFSR suspending signal generation circuit 9 is added; an output of an 8B/10B decoder circuit 8 is connected to the LFSR suspending signal generation circuit 9; and outputs of the 8B/10B decoder circuit 8 and the LFSR suspending signal generation circuit 9 are connected to the descramble circuit 10. The device is otherwise configured identically to the device described in Patent Document 1.

In the data transfer device relating to the present mode, transmission data is supplied to a data transmission device (including a scramble circuit 1, an 8B/10B encoder circuit 2, and a P/S conversion circuit 3) in the data transfer device, and is scrambled by the scramble circuit 1. Next, the 8B/10B encoder circuit 2 encodes the 8-bit data into 10-bit data so that data of "0" or "1" do not successively occur a predetermined number or more of times. Then, the P/S conversion circuit 3 converts the parallel data into serial data, and the data is transmitted to a differential transmission Lane 4.

Further, in the data transfer device relating to the present mode, data received from a differential reception Lane 5 is supplied to a data reception device (including an S/P conversion circuit 6, an elastic buffer circuit 7, the 8B/10B decoder circuit 8, the LFSR suspending signal generation circuit 9, and the descramble circuit 10) in the data transfer device and is converted from serial data into parallel data by the S/P conversion circuit 6. Then the elastic buffer circuit 7 corrects the clock frequency deviation between the transmitter and the receiver, and the 8B/10B decoder circuit 8 decodes the 10-bit data into 8-bit data. The data decoded by the 8B/10B decoder circuit 8 is outputted to the LFSR suspending signal generation circuit 9 and the descramble circuit 10. The LFSR suspending signal generation circuit 9 determines whether the linear feedback shift register (LFSR) should operate or be suspended based on the output data (symbol) from the 8B/10B decoder circuit 8, generates the LFSR suspending signal, a control signal, according to this decision, and outputs the signal to the descramble circuit 10. In response to the LFSR suspending signal from the LFSR suspending signal generation circuit 9, the descramble circuit 10 descrambles the output data from the 8B/10B decoder circuit 8 and outputs the resultant data. In other words, when the LFSR suspending signal from the LFSR suspending signal generation circuit 9 is a signal suspending the LFSR, the descramble circuit 10 controls the suspension of the LFSR upon receiving the SKP symbol, and descrambles and outputs the data outputted from the 8B/10B decoder circuit 8. On the other hand, when the LFSR suspending signal from the LFSR suspending signal generation circuit 9 is a signal letting the LFSR operate, the descramble circuit 10 does not suspend the LFSR upon receiving the SKP symbol, and descrambles and outputs the data outputted from the 8B/10B decoder circuit 8.

Based on timing adjustment data (referred to as "SKP symbol" hereinafter) included in a timing adjustment data set (referred to as "SKP ordered set" hereinafter), the LFSR suspending signal generation circuit 9 outputs a required number of the LFSR suspending signals upon receiving a first normal SKP symbol so that the LFSR is suspended for a desired number of times. Because of this, the LFSR suspending signal generation circuit 9 has a SKP counter (not shown in the drawing) that counts a required number of SKP symbols.

The LFSR suspending signal generation circuit 9 outputs a required number of the LFSR suspending signals upon receiving a first normal SKP symbol, regardless of the kind of symbols received thereafter. As a result, effects that inconsistency does not occur between the scramble processing on the transmitter's side and the descramble processing on the receiver's side and that the re-execution of the transfer processing does not occur even when the last SKP symbol in a SKP ordered set is damaged can be obtained.

More concretely, the LFSR suspending signal generation circuit 9 recognizes a first SKP symbol. Desired descramble processing is achieved by outputting a required number (the number of SKP symbols constituting the SKP ordered set and following the recognized first SKP symbol) of the LFSR suspending signals, regardless of the kind of symbols received, thereby suspending the LFSR of the output data from the 8B/10B decoder circuit 8 in the descramble circuit 10. Further, when the LFSR suspending signal generation circuit 9 outputs a required number of LFSR suspending signals after receiving a first normal SKP symbol, the LFSR suspending signal generation circuit 9 may operate in such a way that it always outputs the LFSR suspending signal regardless of the normality of the received symbol, or it outputs the LFSR suspending signal only when the received symbol is not a SKP symbol and does not output the LFSR suspending signal when it receives a normal SKP symbol.

Figure 2:
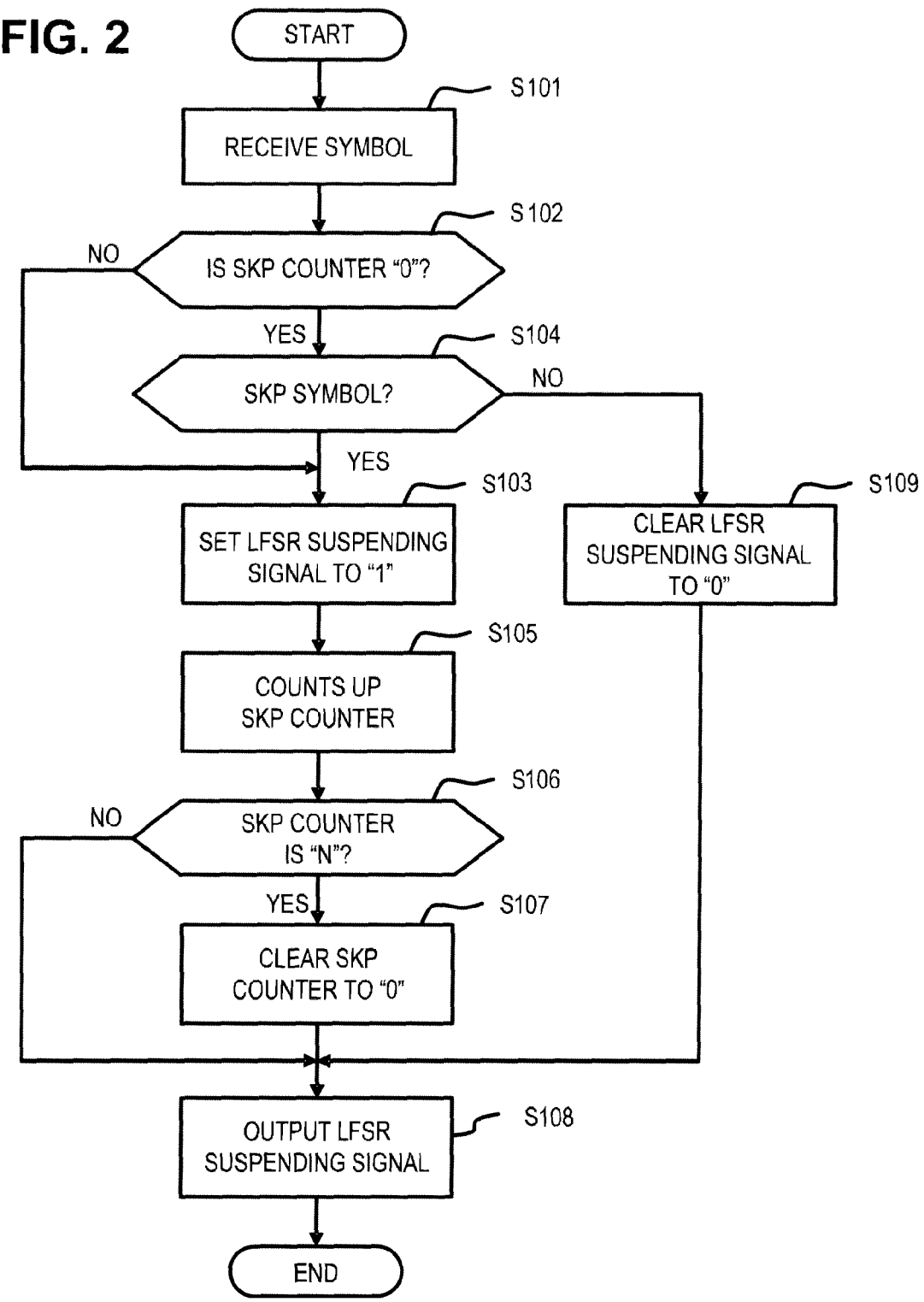
FIG. 2 is a flowchart schematically showing the operation of an LFSR suspending signal generation circuit in the data transfer device relating to a mode of the present invention.

Next, the operation of the LFSR suspending signal generation circuit in the data transfer device relating to a mode of the present invention will be described with reference to the drawing. FIG. 2 is a flowchart schematically showing the operation of the LFSR suspending signal generation circuit in the data transfer device relating to a mode of the present invention.

As shown in FIG. 2, upon receiving a symbol (step S101), the LFSR suspending signal generation circuit (9 in FIG. 1) determines whether or not the SKP counter of the symbols is "0" (step S102). When the SKP counter is not "0" (NO in step S102), the operation proceeds to step S103.

When the SKP counter is "0" (YES in step S102), the LFSR suspending signal generation circuit (9 in FIG. 1) determines whether or not the received symbol is a SKP symbol (step S104). When it is not a SKP symbol (NO in step S104), the LFSR suspending signal generation circuit (9 in FIG. 1) clears the LFSR suspending signal to "0" (step S109), and proceeds to step S108 thereafter.

When the SKP counter is not "0" (NO in the step S102), or the received symbol is a SKP symbol (YES in step S104), the LFSR suspending signal generation circuit (9 in FIG. 1) sets the LFSR suspending signal to "1" (step S103). Note that, in the description of the present mode, the LFSR suspending signal is defined such that it is data of only 1 bit, and when it is set to "1," the LFSR is suspended, and when it is cleared to "0," the LFSR operates.

After step S103, the LFSR suspending signal generation circuit (9 in FIG. 1) counts up the SKP counter (step S105). After the step S105, the LFSR suspending signal generation circuit (9 in FIG. 1) determines whether or not the SKP counter indicates "N" (step S106). Here, "N" denotes the number of SKP symbols included in a SKP ordered set. When the SKP counter does not indicate "N" (NO in step S106), the operation proceeds to step S108.

When the SKP counter indicates "N" (YES in step S106), the LFSR suspending signal generation circuit (9 in FIG. 1) clears the SKP counter to "0" (step S107).

When the SKP counter does not indicate "N" (NO in step S106), or after S107, or after step S109, the LFSR suspending signal generation circuit (9 in FIG. 1) outputs the LFSR suspending signal (step S108), which will be transmitted to the descramble circuit (10 in FIG. 1) thereafter. Further, when the SKP counter is cleared to "0" in step S107, or when the SKP counter does not indicate "N" (NO in the step S106), the LFSR suspending signal generation circuit (9 in FIG. 1) outputs the LFSR suspending signal set to "1" in step S108. Further, when the LFSR suspending signal is cleared to "0" in step S109, the LFSR suspending signal generation circuit (9 in FIG. 1) outputs the LFSR suspending signal cleared to "0" in step S108.

Figure 3A:
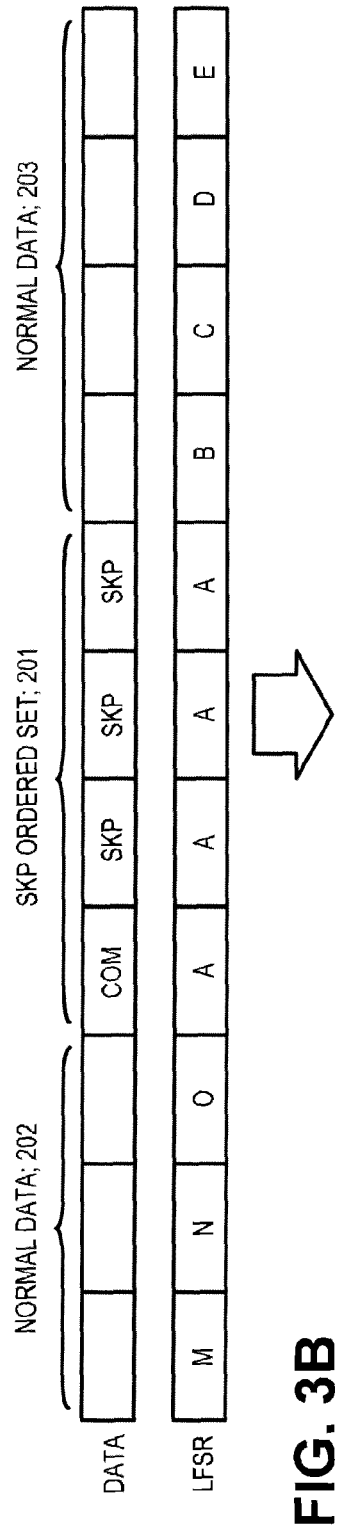
FIG. 3A is a drawing for explaining an example of input data for and an LFSR in a scramble circuit in the case where data is processed in the data transfer device relating to a mode of the present invention in the PCI Express bus system.
Figure 3B:
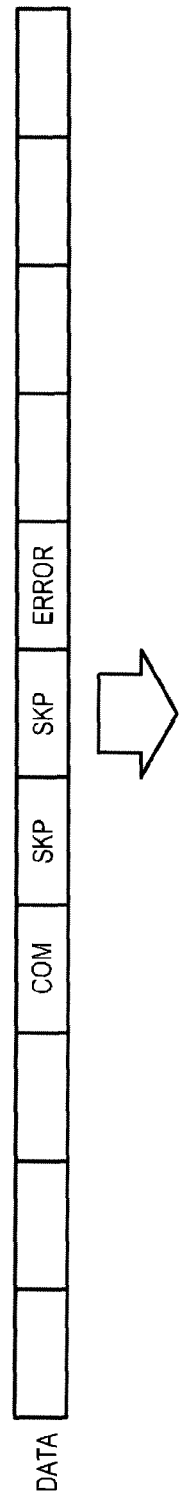
FIG. 3B is a drawing for explaining an example of output data from an 8B/10B decoder circuit.
Figure 3C:
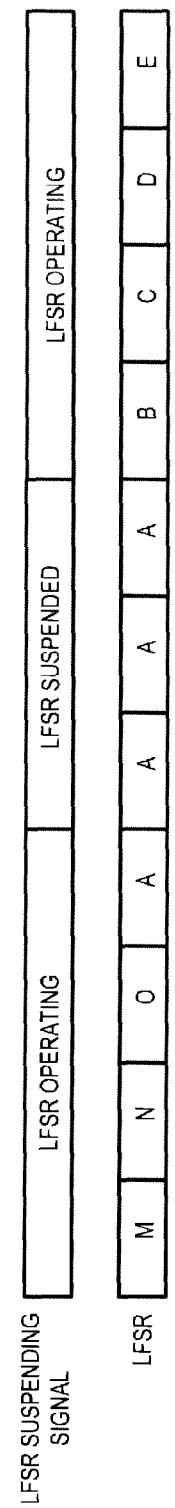
FIG. 3C is a drawing for explaining an example of an LFSR suspending signal and an LFSR in a descramble circuit.

Next, the operation in a case where data is processed in the data transfer device relating to a mode of the present invention in the PCI Express bus system will be described with reference to the drawings. FIG. 3A is a drawing for explaining an example of input data to the scramble circuit and LFSR in the case where data is processed in the data transfer device relating to a mode of the present invention in the PCI Express bus system; FIG. 3B is a drawing for explaining an example of output data from the 8B/10B decoder circuit; and FIG. 3C is a drawing for explaining the LFSR suspending signal and LFSR in the descramble circuit, by way of example.

As shown in FIG. 3A, a SKP ordered set 201 in the PCI Express bus system is constituted by a COM symbol and three SKP symbols on the transmitter's side. The SKP ordered set 201 is inserted between normal data 202 and 203 that are neither COM symbol nor SKP symbol.

On the receiver's side, the elastic buffer circuit (7 in FIG. 1) adjusts the timing with the transmitter by increasing/decreasing the number of SKP symbols in the SKP ordered set. As a result, the SKP ordered set 201 is constituted by one COM symbol and one to five SKP symbols on the receiver's side. Here, the elastic buffer circuit (7 in FIG. 1) notifies the LFSR suspending signal generation circuit (9 in FIG. 1) of the number of SKP symbols included in the SKP ordered set via the 8B/10B decoder circuit (8 in FIG. 1). The LFSR suspending signal generation circuit (9 in FIG. 1) sets "N" (the number of the SKP counter) based on this notification.

Then, when detecting a first SKP symbol, the LFSR suspending signal generation circuit (9 in FIG. 1) sets the LFSR suspending signal to "1" and outputs it; the LFSR suspending signal generation circuit outputs the LFSR suspending signal that remains set to "1" regardless of what kind of symbol follows the detected SKP symbol. The period in which the LFSR suspending signal outputted from the LFSR suspending signal generation circuit (9 in FIG. 1) is set to "1" may not be predetermined, or it may be determined from the data received by the LFSR suspending signal generation circuit 9, or it may be determined by an external command. In the present mode, it is assumed that the LFSR suspending signal generation circuit (9 in FIG. 1) receives an instruction regarding the number of SKP symbols from the elastic buffer circuit (7 in FIG. 1).

Here, the case where a SKP ordered set includes three SKP symbols will be described. For instance, as shown in FIG. 3B, even when the third SKP symbol in the SKP ordered set gets damaged and becomes an error symbol, the LFSR suspending signal generation circuit (9 in FIG. 1) sets the LFSR suspending signal to "1" and outputs it to the descramble circuit 10 at a timing at which the first SKP symbol is received and at a timing at which the next symbol is received. In the present example, since there are three SKP symbols constituting the SKP ordered set, the LFSR suspending signal generation circuit (9 in FIG. 1) outputs the LFSR suspending signals while having it set to "1" at the timing at which it receives the first SKP symbol and at the timings at which it receives the following two symbols.

Therefore, as shown in FIG. 3C, the descramble circuit (10 in FIG. 1) receives three LFSR suspending signals. Since the LFSR is suspended because of this, the scramble processing and the descramble processing on the data will correspond with each other after the three SKP symbols have been outputted. At this time, even if the second SKP symbol is damaged as well, there will be no consequence, either.

Even when the second SKP symbol in the SKP ordered set gets damaged and becomes an error symbol, the LFSR suspending signal generation circuit (9 in FIG. 1) outputs three LFSR suspending signals. Since the LFSR in the descramble circuit (10 in FIG. 1) is suspended corresponding to the three SKP symbols, the scramble processing and the descramble processing on the data will correspond with each other after the SKP ordered set has been outputted.

Further, when the first SKP symbol in the SKP ordered set gets damaged and becomes an error symbol, the error symbol does not get replaced and is supplied to the descramble circuit 10. The LFSR suspending signal generation circuit (9 in FIG. 1), however, regards the second SKP symbol that is normal as the first symbol, and outputs the LFSR suspending signals at the timings at which it receives the following two symbols, a total of three timings. The LFSR in the descramble circuit (10 in FIG. 1) ends up operating because the error symbol is supplied at a timing at which the first SKP symbol is supposed to be supplied, however, since the LFSR is suspended for three symbols by recognizing three LFSR suspending signals outputted at the timings at which the second symbol and the following symbols are received, the scramble processing and the descramble processing on the data will correspond with each other after the SKP ordered set has been outputted.

Figure 4:
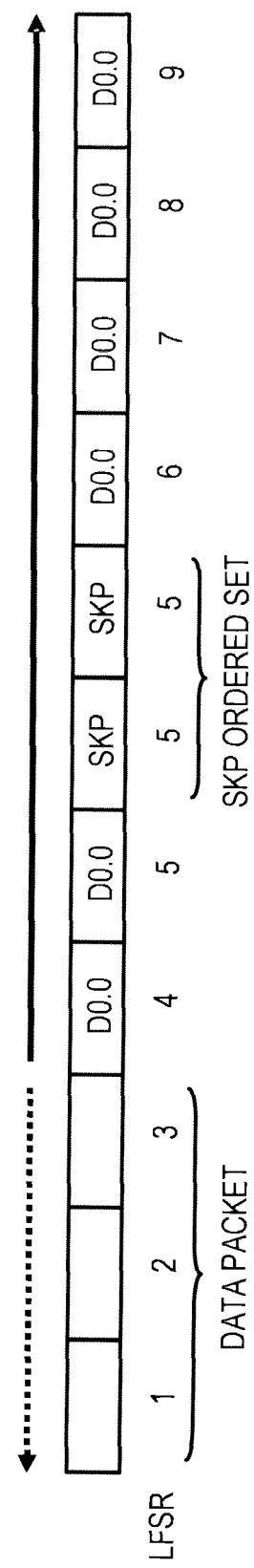
FIG. 4 is a drawing for explaining an example of data supplied to the scramble circuit in the case where data is processed in the data transfer device relating to a mode of the present invention in the USB 3.0 system.

Next, the operation in a case where data is processed in the data transfer device relating to a mode of the present invention in the USB 3.0 system will be described with reference to the drawings. FIG. 4 is a drawing for explaining an example of data supplied to the scramble circuit in the case where data is processed in the data transfer device relating to a mode of the present invention in the USB 3.0 system.

As shown in FIG. 4, in the USB 3.0 system, a SKP ordered set is embedded at a regular interval (at every 354 symbols) during an idle time of data transmission (D0.0, i.e., a D code 00h is transmitted). While data packets are transferred (LFSR 1 to 3), no SKP ordered set is embedded.

In the USB 3.0 system, a SKP ordered set is constituted by two SKP symbols. Unlike the PCI Express bus system, a SKP ordered set does not include any COM symbol in the USB 3.0 system. Therefore, the aforementioned "N" value (the count value of the SKP counter) is normally "2."

Figure 5:
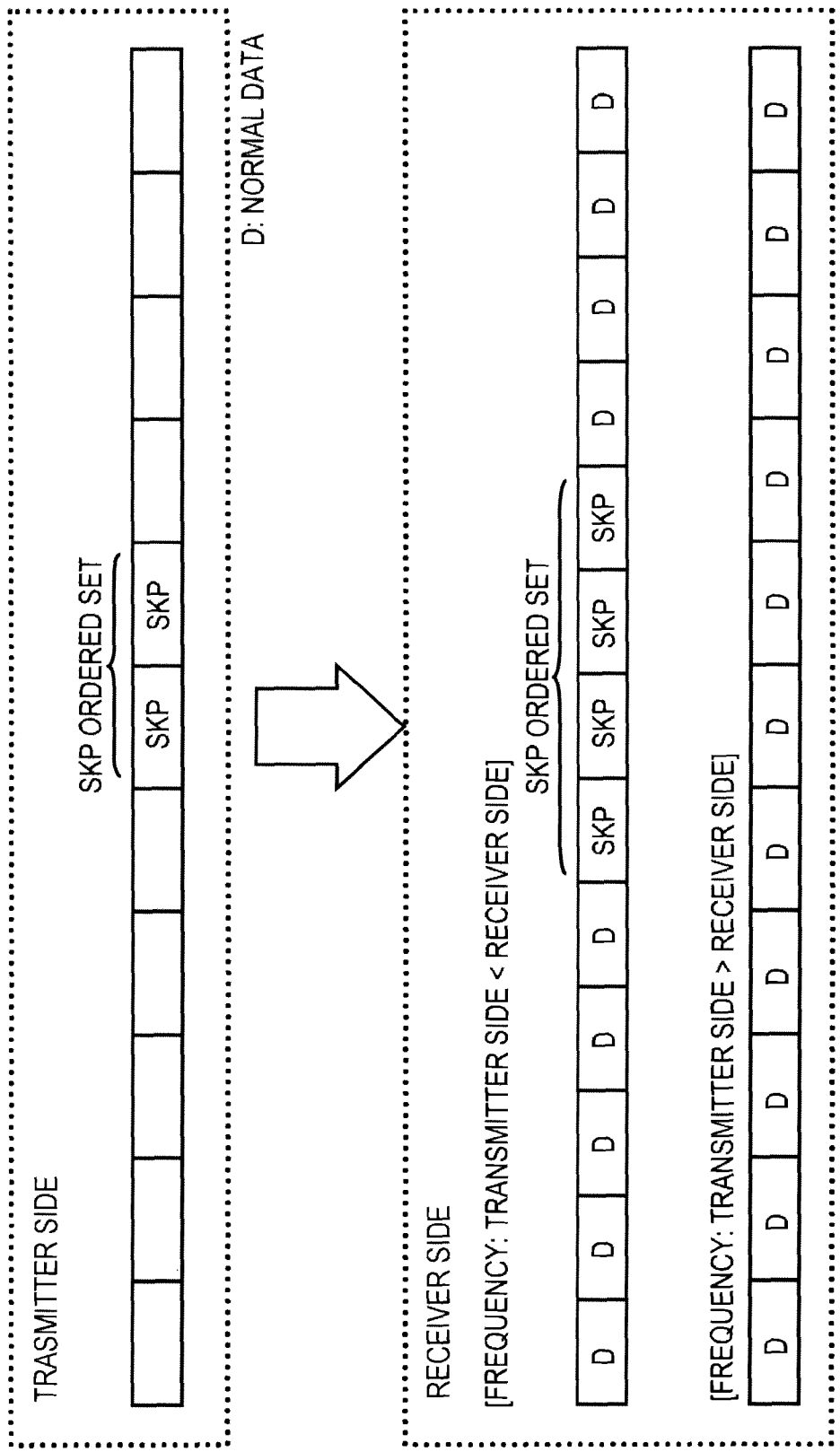
FIG. 5 is a drawing for explaining examples of data respectively supplied to the scramble circuit on the transmitter's side and the descramble circuit on the receiver's side in the case where data is processed in the data transfer device relating to a mode of the present invention in the USB 3.0 system.

FIG. 5 is a drawing for explaining examples of data respectively supplied to the scramble circuit on the transmitter's side and the descramble circuit on the receiver's side in the case where data is processed in the data transfer device relating to a mode of the present invention in the USB 3.0 system.

Here, since the elastic buffer circuit (7 in FIG. 1) corrects the frequency deviation for every SKP ordered set, the number of SKP symbols is increased/decreased. In other words, since the number is always increased/decreased by the unit of two, "N" is always an even number.

As shown in FIG. 5, for instance, when the frequency of the receiver side is greater than that of the transmitter side, the Physical Layer of the receiver side increases the number of SKP ordered sets and hands them to the Link Layer. On the other hand, when the frequency of the transmitter side is greater than that of the receiver side, the Physical Layer of the receiver side decreases the number of SKP ordered sets and hands them to the Link Layer. The LFSRs in the scramble circuit (1 in FIG. 1) and the descramble circuit (10 in FIG. 1) do not operate with a SKP symbol.

When recognizing a first SKP symbol, the LFSR suspending signal generation circuit 9 sets the LFSR suspending signal to "1" and outputs it, regardless of what kind of symbol follows the SKP symbol.

FIG. 6A is a drawing for explaining an example of input data for and the LFSR in the scramble circuit when an error occurs in a SKP ordered set in the case where data is processed in the data transfer device relating to a mode of the present invention in the USB 3.0 system; FIG. 6B is a drawing for explaining an example of output data from the 8B/10B decoder circuit; and FIG. 6C is a drawing for explaining, by way of an example, the LFSR suspending signal and the LFSR in the descramble circuit.

As shown in FIG. 6A, a SKP ordered set 201 is inserted between normal data 202 and 203 on the transmitter's side.

Then, as shown in FIG. 6B, when an error occurs on the first SKP symbol in the SKP ordered set 201 due to noise superposed on the data on a channel, the LFSR suspending signal generation circuit (9 in FIG. 1) regards the second SKP symbol as the first SKP symbol in this case, and sets the LFSR suspending signal to "1" and outputs it. Then, at the timing at which the following symbol is received, the LFSR suspending signal generation circuit (9 in FIG. 1) sets the LFSR suspending signal to "1" and outputs it as well. The LFSR in the descramble circuit 10 ends up operating because the error symbol is supplied at a timing at which the first SKP symbol is supposed to be supplied. However, since the LFSR is suspended for two symbols by recognizing the second SKP symbol, the scramble processing and the descramble processing on the data will correspond with each other after the two SKP symbols have been outputted.

If the second SKP symbol gets damaged and becomes an error symbol, the descramble circuit 10 will set the LFSR suspending signal to "1" at the timings at which the first normal SKP symbol and the next symbol are supplied. As a result, the LFSR will be suspended, and the scramble processing and the descramble processing on the data will correspond with each other after the SKP ordered set has been outputted.

Next, data transfer in the data transfer device relating to a mode of the present invention in the USB 3.0 system will be further described in detail. FIG. 7 is a drawing for explaining other examples of data respectively supplied to the scramble circuit on the transmitter's side and the descramble circuit on the receiver's side in the case where data is processed in the data transfer device relating to a mode of the present invention in the USB 3.0 system.

As shown in FIG. 7, the transmitter transmits data, in which two SKP symbols are inserted, as a SKP ordered set. Let's assume that an error occurs on the first SKP symbol of the SKP ordered set. In this case, upon receiving the second SKP symbol, which is normal, the LFSR suspending signal generation circuit (9 in FIG. 1) sets the LFSR suspending signal to "1" and outputs it at the timings at which the second symbol and the next symbol are received. The LFSR shifts in the descramble circuit (10 in FIG. 1) due to the error symbol, however, the LFSR is suspended for two symbols thereafter because of the LFSR suspending signals. As a result, the data becomes normal after the SKP ordered set has been outputted.

In the USB 3.0 system, four symbols (SHP, SHP, SHP, and EPF) are defined as a data set indicating the start of a data packet, however, the start of the data packet can be recognized if three symbols (SHP, SHP, and EPF) out of the four are read. In the present example, since symbols immediately after a SKP ordered set do not cause any inconsistency for the LFSR and all the four symbols are normally descrambled, the start of a data packet can be recognized.

Figure 8:
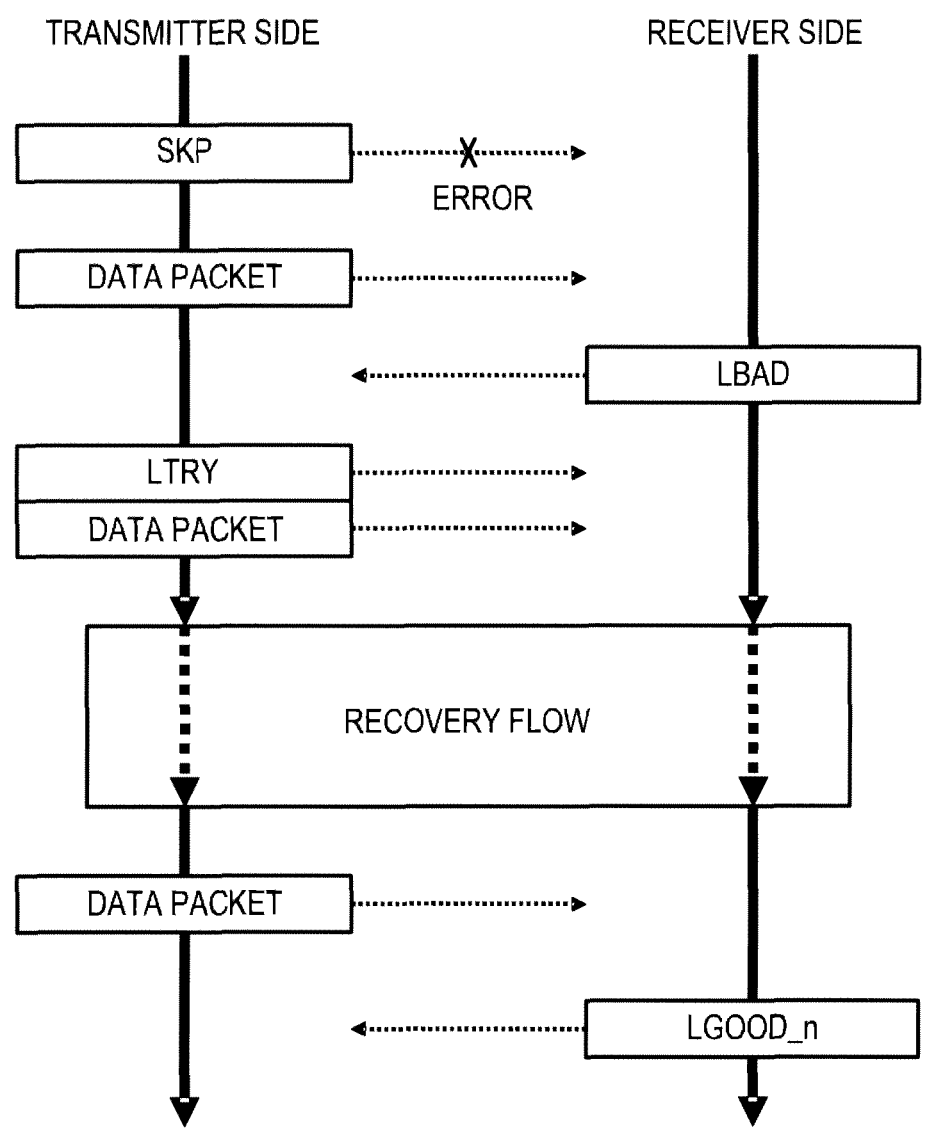
FIG. 8 is a schematic diagram schematically showing a recovery operation of a data communication device relating to a comparative example.
Figure 9:
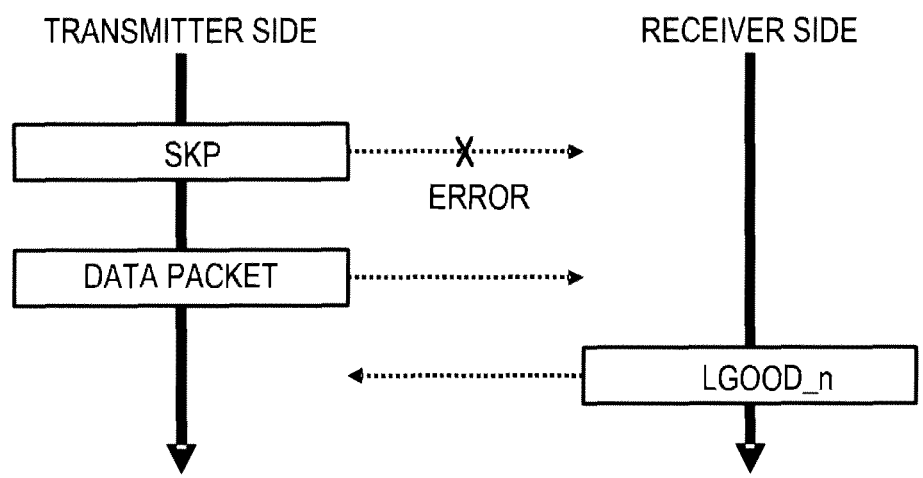
FIG. 9 is a schematic diagram schematically showing an operation of the data transfer device relating to a mode of the present invention.
Figure 10:
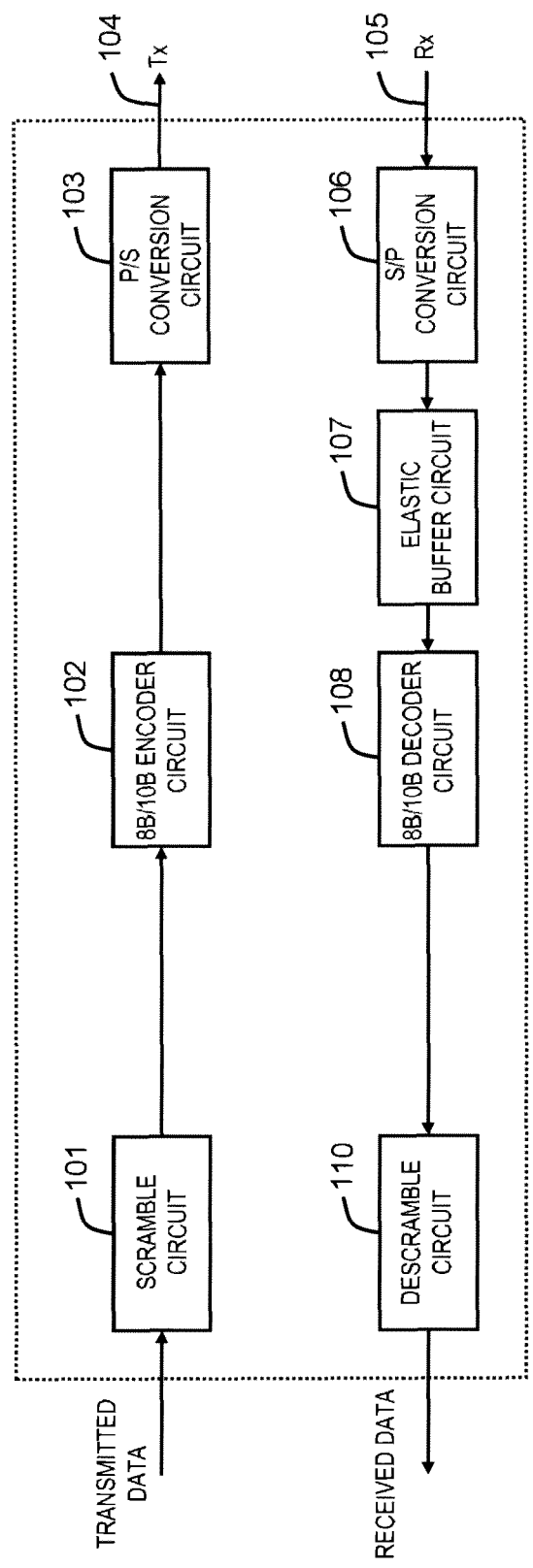
FIG. 10 is a block diagram schematically showing the configuration of a data transfer device using the PCI Express bus system to which a technology described in Patent Document 1 is not applied.

Next, the operation of the data transfer device relating to a mode of the present invention will be further described with reference to the drawings, comparing with a comparative example. FIG. 8 is a schematic diagram schematically showing the recovery operation of a data communication device relating to the comparative example. FIG. 9 is a schematic diagram schematically showing the operation of the data transfer device relating to a mode of the present invention. Note that the recovery operation shown in FIG. 8 corresponds to that of the data reception device described in Patent Document 1, to which the LFSR suspending signal generation circuit is not applied (refer to FIG. 11).

As shown in FIG. 8, when an error occurs on a SKP symbol, a data packet transmitted by the transmitter is not received in normal manner in the data communication device relating to the comparative example. In this case, the receiver transmits a notification (LBAD) informing that the data could not be received. The transmitter transmits a notification (LRTY) indicating "retry" and the data packet. At this time, when the receiver does not transmit a signal indicating the completion of data reception to the transmitter for a predetermined period of time, the transmitter decides that the transmission has timed out and executes recovery processing. In the recovery processing, the transmitter side transmits a COM symbol to initialize the descramble circuit. On the receiver's side, the descramble timing is adjusted by the COM symbol, and the receiver side will be able to receive data from the transmitter side in normal manner. When data has been received normally, the receiver side transmits the notification (LGOOG_n) indicating the completion of data reception to the transmitter side. As described, in the data communication device relating to the comparative example, a recovery flow is required when an error occurs in a timing adjustment data set, thereby delaying the transfer rate of data.

On the other hand, as described above, when an error occurs on a SKP ordered set, the data transfer device relating to the present mode outputs a required number of the LFSR suspending signals upon receiving a first SKP symbol so as to simulate a situation as if a desired number of SKP symbols included in the SKP ordered set were received. As a result, as shown in FIG. 9, the following data packet can be received even when an error occurs on a SKP ordered set. In other words, no recovery flow is required, thereby avoiding a decrease in data transfer rate.

Further, since the data transfer device relating to the present mode is configured such that, when an error occurs on any SKP symbol constituting a SKP ordered set, the LFSR suspending signal generation circuit (9 in FIG. 1) outputs the LFSR suspending signals at a total of three timings: after receiving a first normal SKP symbol, and two consecutive timings at which the following two symbols are received, and the LFSR is suspended by the LFSR suspending signals in the descramble circuit 10, the timing of descrambling and scrambling on the following data can be matched.

As a result, the data transfer device relating to the present mode is able to perform descramble processing in normal manner when an error occurs on any SKP symbol constituting a SKP ordered set in the USB 3.0 system. In contrast, in the technology described in Patent Document 1, it is difficult to increase the transfer rate because, as described, a recovery flow is always required when an error occurs on a SKP ordered set in the USB 3.0 system.

In summary, as the first effect, the re-execution of transfer processing is not required even when the last SKP symbol in a SKP ordered set is damaged. The reason is that inconsistency between the LFSR in the scramble circuit 1 and the LFSR in the descramble circuit is avoided by setting the LFSR suspending signal to "1" and outputting it after the first normal SKP symbol has been received, regardless of what kind of symbol is received thereafter, so as to simulate a situation as if a desired number of SKP symbols constituting the SKP ordered set were received, thereby suspending the LFSR.

As the second effect, the present mode can be applied to a communication protocol that does not define which symbol in a SKP ordered set initializes the LFSRs in the scramble circuit 1 and the descramble circuit 10, such as the USB 3.0 system. The reason is that the COM symbol that initializes the LFSR in the descramble circuit 10 is not used.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned.

For instance, the mode described above has been explained as the configuration of hardware, however, the present invention is not limited to this, and any processing can be realized by having a CPU (Central Processing Unit) execute a computer program. In this case, it is possible to provide the computer program stored on a storage medium or transmitted via a transmission medium such as the Internet.

Further, the number of SKP symbols in a timing ordered set is different for PCI Express and USB 3.0. Therefore, a function of determining what protocol the current data uses may be provided for the LFSR suspending signal generation circuit 9, and the number of timings "N" (the set value of the SKP counter) at which the LFSR is suspended may be set according to the decision result. Or the number of timings "N" at which the LFSR is suspended may be set by an external command. By making the counter value of the SKP counter in the LFSR suspending signal generation circuit 9 variably settable, the supplement processing described above can performed on data using any protocol.

It should be noted that other objects, features and aspects of the present invention will become apparent in the entire disclosure and that modifications may be done without departing the gist and scope of the present invention as disclosed herein and claimed as appended herewith. Also it should be noted that any combination or selection of the disclosed and/or claimed elements, matters and/or items may fall under the modifications aforementioned.

What is claimed is:

1. A data reception device comprising:
    an elastic buffer circuit that receives scrambled and transmission data as received data and adjusts timing with a transmitter side;
    an LFSR suspending signal generation circuit that performs predetermined supplement processing on data whose timing has been adjusted by said elastic buffer circuit and that outputs an LFSR suspending signal; and
    a descramble circuit that descrambles data whose timing has been adjusted by said elastic buffer circuit in response to an LFSR suspending signal outputted from said LFSR suspending signal generation circuit; wherein
    said received data has a timing adjustment data set that adjusts the timing with the transmitter side; and
    said LFSR suspending signal generation circuit receives a desired number of timing adjustment data included in said timing adjustment data set, and outputs a required number of LFSR suspending signals so that said descramble processing is normally performed after first normal timing adjustment data has been received.

2. The data reception device as defined in claim 1, wherein said timing adjustment data set is a SKP ordered set, and said timing adjustment data is a SKP symbol.

3. The data reception device as defined in claim 1, wherein the number of LFSR suspending signals outputted from said LFSR suspending signal generation circuit is settable to any number.

4. The data reception device as defined in claim 1, wherein said elastic buffer circuit adjusts timing in a unit of said timing adjustment data set.

5. The data reception device as defined in claim 1, wherein said elastic buffer circuit adjusts timing by increasing or decreasing said timing adjustment data included in said timing adjustment data set.

6. The data reception device as defined in claim 1, wherein said LFSR suspending signal generation circuit calculates the number of timing adjustment data included in a timing adjustment data set based on a notification from said elastic buffer circuit, and outputs an LFSR suspending signal according to the number of the timing adjustment data after first timing adjustment data has been received.

7. The data reception device as defined in claim 1, wherein said descramble circuit receives data from said elastic buffer circuit and an LFSR suspending signal from said LFSR suspending signal generation circuit, and performs descramble processing according to a timing adjustment data set included in the data from said elastic buffer circuit and the LFSR suspending signal.

8. The data reception device as defined in claim 1, wherein said received data is data in the USB 3.0 system.

9. The data reception device as defined in claim 1, wherein said received data is data in the PCI Express bus system.

10. A data transfer method of a data reception device that receives scrambled and transmission data as received data and that descrambles and outputs the data after adjusting timing with a transmitter side, the method comprising:
    detecting timing adjustment data included in a timing adjustment data set that adjusts timing with the transmitter side in data on which said descramble processing has not been performed; and
    outputting a required number of LFSR suspending signals, after first normal timing adjustment data has been received, at an output timing of data received thereafter so as to simulate a situation as if a desired number of timing adjustment data included in said timing adjustment data set were received.

11. The data transfer method as defined in claim 10, wherein said timing adjustment data set is a SKP ordered set, and said timing adjustment data is a SKP symbol.

12. The data transfer method as defined in claim 10, wherein the number of LFSR suspending signals outputted after first normal timing adjustment data has been received is settable to any number.

13. The data transfer method as defined in claim 10, wherein the timing of said received data is adjusted in a unit of said timing adjustment data set.

14. The data transfer method as defined in claim 10, wherein the timing of said received data is adjusted by increasing or decreasing said timing adjustment data included in said timing adjustment data set.

15. The data transfer method as defined in claim 10, comprising:
    calculating the number of timing adjustment data included in a timing adjustment data set of said received data based on a notification from an elastic buffer circuit that adjusts the timing with the transmitter side; and
    outputting a required number of LFSR suspending signals according to the number of the timing adjustment data, after first timing adjustment data has been received, at an output timing of data received thereafter.

16. The data transfer method as defined in claim 10, wherein said received data is data in the USB 3.0 system.

17. The data transfer method as defined in claim 10, wherein said received data is data in the PCI Express bus system.

18. A non-transitory medium storing a program that causes a computer to execute operations of receiving scrambled and transmission data as received data, and of descrambling and outputting data after adjusting timing with a transmitter side, comprising:

- detecting timing adjustment data included in a timing adjustment data set that adjusts timing with a transmitter side in the data on which said descramble processing has not been performed; and
- outputting a required number of LFSR suspending signals after first normal timing adjustment data has been received so that a desired number of timing adjustment data included in said timing adjustment data set are received and said descramble processing is performed normally.

* * * * *